Feb. 13, 1923.
W. WATSON
LUGGAGE CARRIER FOR AUTOMOBILES
Filed Oct. 10, 1921
1,444,817
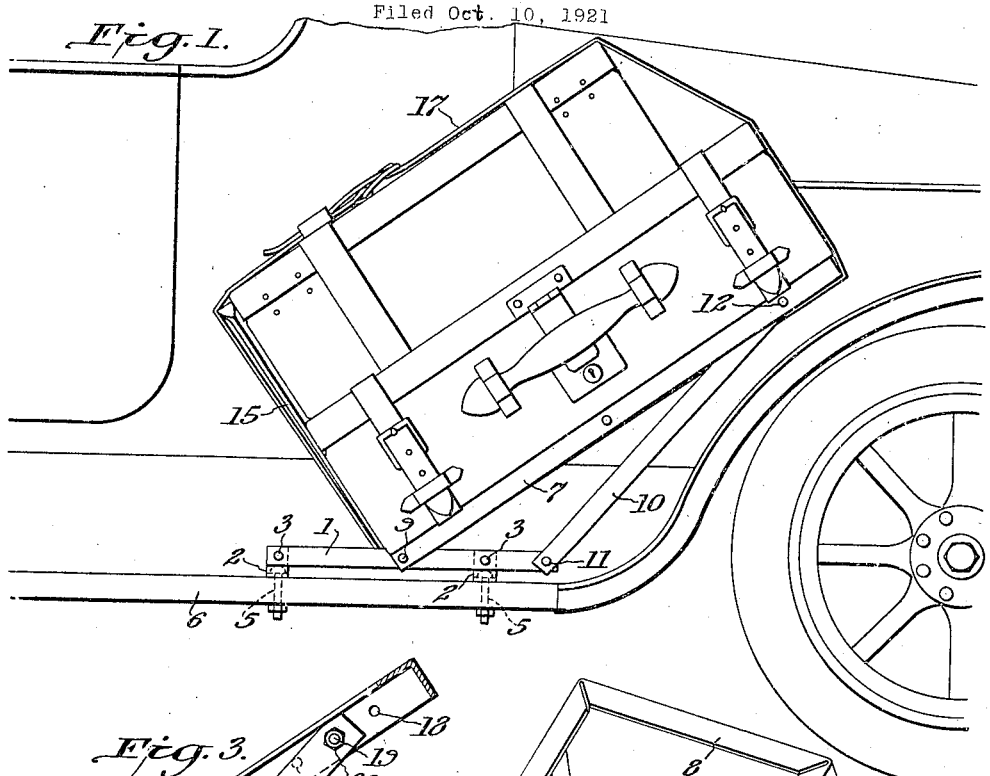
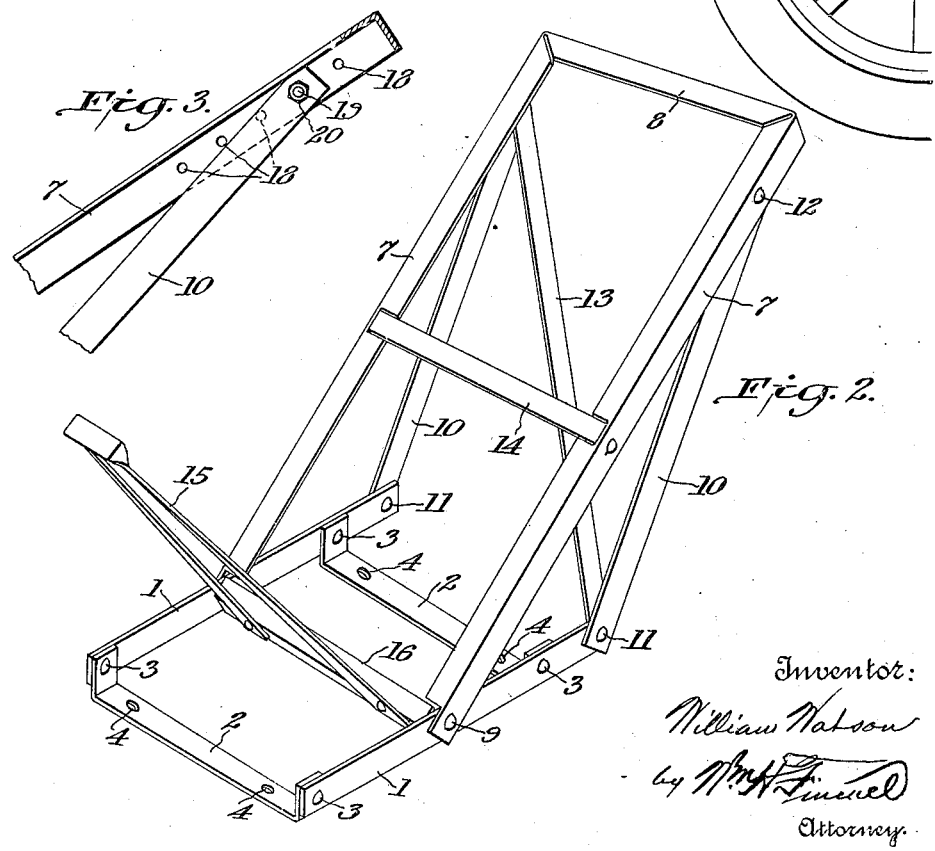
Inventor:
William Watson
by W. M. Finnell
Attorney.

Patented Feb. 13, 1923.

1,444,817

UNITED STATES PATENT OFFICE.

WILLIAM WATSON, OF NEW YORK, N. Y.

LUGGAGE CARRIER FOR AUTOMOBILES.

Application filed October 10, 1921. Serial No. 506,751.

*To all whom it may concern:*

Be it known that I, WILLIAM WATSON, a subject of the King of Great Britain, and having declared my intention of becoming a citizen of the United States, residing at New York, in the county of New York and State of New York, have invented a certain new and useful Improvement in Luggage Carriers for Automobiles, of which the following is a full, clear, and exact description.

The object of this invention is to provide a luggage carrier of such nature that it may be mounted upon the running board of an automobile or other vehicle and be piled with luggage, and yet in no way interfere with the comfortable use of the vehicle, and, in the case of automobiles especially, not obstruct the direct path of access to the vehicle body or interfere with the opening and closing of the doors thereof.

The invention consists in a luggage carrier comprising a base frame adapted to be securely bolted or otherwise affixed to the running board of a vehicle, this frame supporting a luggage platform having one of its ends secured to the frame and its other end extending upwardly therefrom at an angle and held and supported in such position by a brace extending between it and the frame, luggage piled upon this platform being prevented from sliding off by a stop member rising at an angle from the point of attachment of the platform with the frame; the luggage being securely held in position upon the platform and against the stop member by means of one or more flexible members such as straps, passing completely around the luggage and platform and preferably also over the stop member, as will be hereinafter explained and finally claimed.

In the accompanying drawings illustrating the invention, in the several figures of which like parts are similarly designated, Figure 1 is a side elevation of the front portion of an automobile showing the luggage carrier applied and with suit cases strapped thereon. Fig. 2 is a perspective view of the carrier detached. Fig. 3 is a fragmentary sectional view illustrating a modification whereby the luggage platform may be adjusted to fenders of various inclinations.

The carrier comprises a base frame composed of side-members 1 and cross-members 2, suitably connected by means of rivets 3 or the like. The cross-members 2 are preferably of U shape and extend somewhat below the lower edges of the side-members 1, and are provided with openings 4 through which bolts 5 or the like may be passed to securely attach the carrier to the running board 6 of a vehicle.

A luggage platform comprising side-members 7 and an end member 8 preferably formed of a strip of angle-iron, bent to shape, is attached at one end to the side-members 1, substantially midway of their length, by means of rivets 9 or the like, and its other end extends upwardly from the base frame at an angle and is supported in this position by a brace composed of members 10 suitably secured to the side-members 1 of the frame and 7 of the platform by rivets 11 and 12 or the like, respectively. A diagonal strut 13 extending from a side member 1 to the side member 7 opposite thereto may be provided, if desired, to prevent swaying of the platform sidewise, and, also, a cross-bar 14 connecting the side members 7 may be used to stiffen the side members 7 and platform.

Suit cases, as illustrated, or other luggage may be piled upon the platform, and such luggage is prevented from sliding down the incline thereof by means of a stop member comprising an upwardly extending support 15 riveted or otherwise secured to a cross-member 16 attached to the side members 1 of the frame by the rivets or the like 9 which secure the platform. As shown, this stop member is adapted to pivot about the rivets 9 so that it may be folded flat against the platform when the carrier is not in use, but, if desired, it may be made so as to maintain a rigid angular relation to the platform, preferably at a right angle thereto.

When the carrier is in use, the luggage is piled upon the platform so as to rest against the stop member, and then a strap 17 is passed completely around the luggage, the platform, and the stop member and is buckled together at the top, thus holding the luggage securely to the carrier, and, when the stop member is pivoted, as here shown, preventing it from turning on its pivot. Of course, if desirable or necessary, more than one strap may be used, but for ordinary loads of luggage one strap will suffice, the weight of the luggage being supported entirely by the carrier and the strap serving merely to prevent its becoming dislodged.

In Fig. 3 the side members 7 of the luggage platform are shown as provided with a plurality of bolt holes 18, and the members 10 are connected with the side members by means of bolts and nuts 19 and 20, respectively. Shifting the point of attachment of the members 10 to the side members 7 by shifting the bolts 19 from one of the holes 18 to others, the angle of inclination of the luggage platform may be varied to make it approximate the inclination of the fender of the particular vehicle with which the carrier is used.

It will thus be seen that I provide a luggage carrier of light, cheap and durable construction, adapted for easy attachment to and detachment from any type of vehicle having a running board or other support.

Moreover, my carrier, though efficiently performing all that may be required of it, is neither clumsy nor unsightly in appearance, and holds the luggage carried by it securely, out of contact with the body of the car, and out of the way of the users of the car when entering it or alighting from it, the doors being always unobstructed.

Although I have herein shown and described a particular embodiment of my invention, it is to be understood that I do not consider it as limited thereto, as various changes may be made in details of construction and arrangement of parts without departing from the spirit of the invention or the scope of the following claims.

What I claim is:—

1. A luggage carrier, comprising a base frame adapted to be secured to a support, a luggage platform carried thereby and extending upwardly therefrom, a brace connected with said frame and said platform and supporting the upwardly extending portion thereof, and a stop member connected with said frame and arranged at an angle to said platform.

2. In a luggage carrier, a base frame adapted to be secured to the running board of a vehicle, a luggage platform having one of its ends connected with said frame and its other end extending upwardly therefrom, a brace extending between said frame and the upwardly extending end of said platform for supporting the latter, and a stop member connected with said frame adjacent to the connected end of said platform and extending upwardly at an angle to said platform.

3. In a luggage carrier, a base frame adapted to be secured to the running board of a vehicle, a luggage platform secured to said frame and extending upwardly at an angle thereto, a brace extending between said frame and said platform for supporting the latter in its upwardly-extending position, and a stop member rising at an angle to said platform adjacent to the frame-connected end thereof.

4. In a luggage carrier, a base frame adapted to be secured to the running board of an automobile adjacent to the front fender thereof, a luggage platform having one of its ends conected to said frame and its other end extending upwardly and forwardly therefrom so as to overlie said fender, a brace extending between said frame and the forwardly extending end of said platform for supporting said platform out of contact with said fender, and a stop member rising at an angle to said platform from the point of connection of the platform with the frame, the whole constructed and adapted to be arranged on the running board to avoid interference with or obstruction of the doors of the automobile.

5. In a luggage carrier, a base frame comprising side members and cross-members, said cross-members serving as means for attaching the carrier to the running board of a vehicle, a luggage platform connected at one end substantially midway of their length to said side members and having its other end extending upwardly from said frame, brace members extending from the ends of said side members to the upwardly-extending end of said platform for maintaining said platform in proper relation to said frame, and a stop member extending upwardly from the frame-connected end of said platform and at an angle thereto.

6. In a luggage carrier, a base frame adapted to be attached to the running board of an automobile, a platform carried by said frame and adapted to support luggage, said platform arranged at an angle to said frame, and a stop member arranged at an angle to said platform and adapted to prevent said luggage from sliding off of said platform.

7. In a luggage carrier, a base frame adapted to be secured to the running board of an automobile adjacent to the front fender thereof, a luggage platform carried by said frame and extending forwardly and upwardly therefrom at an angle and overlying said fender, and a brace pivotally secured to said frame and adjustably connected with said platform whereby the angle of said platform may be varied to accommodate said carrier to automobiles having fenders of various inclinations with respect to their running boards.

In testimony whereof I have hereunto set my hand this 7th day of October A. D. 1921.

WILLIAM WATSON.

Witnesses:
WM. BATES,
FREDERICK C. BREY.